Patented Apr. 22, 1952

2,593,583

UNITED STATES PATENT OFFICE 2,593,583

METHOD FOR COAGULATING AQUEOUS DISPERSIONS OF POLYTETRAFLUORO-ETHYLENE

John F. Lontz, Wilmington, Del., assignor to E. I. du Pont de Nemours and Company, Wilmington, Del., a corporation of Delaware No Drawing. Application March 14, 1951, Serial No. 215,643

3 Claims. (Cl. 260—92.1)

This invention relates to a method for preparing free-flowing granular tetrafluoroethylene polymers by coagulation of an aqueous colloidal dispersion, and converting such granular polymers to shaped articles. More particularly, the invention relates to specific conditions necessary for preparation of granular polytetrafluoroethylene which is particularly suitable for rolling into unsupported film, tape, sheets and the like.

In Example III of U. S. Patent 2,400,099, an unsupported film of polytetrafluoroethylene is prepared by feeding the powdered polymer between two rolls to form a fragile cold-rolled film which is then sintered to form a tough film of polytetrafluoroethylene, which improves in tensile strength upon continued rolling. In attempting to make continuous polytetrafluoroethylene films and sheeting by this method at a rather rapid rate, it was discovered that the particles of polymer employed in the patent were difficult to feed into the nip of the two rolls, and also that certain particles, when fed through the rolls to form a sheet which was thereafter sintered, produced a finished tape which had a relatively large number of electrical breaks per hundred feet. These faults adversely affect the use of this valuable form of the polymer in certain electrical insulating applications such as wrapping wire with the polymeric tape.

It is an object of this invention to provide a process for making granular polytetrafluoroethylene, suitable for use in the manufacture of tough polytetrafluoroethylene film, tape, sheeting and the like. A further object is to provide a process for coagulating an aqueous colloidal dispersion of tetrafluoroethylene polymer to yield a free-flowing granular coagulum in a form suitable for continuous rolling into tape having improved properties, and for other uses. Other objects will be apparent from the description of the invention given below.

The above objects are accomplished by a process which comprises coagulating tetrafluoroethylene polymer from an aqueous colloidal dispersion of the polymer by agitation at a controlled critical rate which produces free-flowing granules. In general, the dispersion which is employed is one which is stable on storage, and which has a polymer content in the range of 10%–50% solids by weight. The agitation of said dispersion is generally performed, in practising this invention, at a temperature of 32° F. to 185° F. in a vessel containing an agitator, the size and shape of the vessel and the dimensions and speed of the agitator being adjusted to supply power to the aqueous dispersion in the range of 0.02 to 1.00 horsepower per gallon of aqueous dispersion contained in said vessel, said agitation being effective throughout a major part of the said dispersion. The coagulated particles of polymer may be thereafter removed from the water, yielding free-flowing granules. It is preferred for rolling the product into tape that the aqueous dispersion of polymer contain between 10% and 20% of polytetrafluoroethylene by weight, and that the power supplied to the aqueous dispersion during the coagulation at a temperature of 60° F. to 110° F. be in the range of 0.08 to 0.80 horsepower per gallon of aqueous dispersion in the vessel.

The "free-flowing" polytetrafluoroethylene granules herein disclosed can be fed between two rotating calender rolls to form a continuous film or tape without forming agglomerates which bridge across the nip of the rolls and partially or completely prevent continuous feeding. These granules can also be used in making molded articles, including shaped articles from which tape or films can be shaven if desired.

It has been found that in order to provide a free-flowing granular polytetrafluoroethylene which is both easily fed continuously into the nip of two rolls to form polytetrafluoroethylene films, tapes and sheets, as well as to obtain said films, tapes and sheets having high-grade mechanical and electrical properties, the speed of the agitator and the concentration of polytetrafluoroethylene in the aqueous dispersion before coagulation are both critical factors for a given coagulation system; that is, in a vessel having a fixed size and shape, having a certain number of suitably placed baffles and an agitator of fixed design. Thus, as the type of vessel and type of baffles and agitator are changed, the speed of agitation must also be changed so that the total power supplied to the aqueous dispersion is within well defined limits; namely, from 0.02 to 1.00 horsepower per gallon of aqueous dispersion contained in the vessel.

The temperature of the aqueous polymer dispersion during coagulation should be in the range of 32° F. to 185° F., and the dispersion should not be frozen during coagulation. The use of temperatures above 185° F. tends to swell the polymer and produce a gel which is not free-flowing. It is preferred to carry out the coagulation with the aqueous dispersion at a temperature within the range of 60° F.–110° F.

Another factor which must be considered in obtaining suitable particles for rolling into tape is the concentration of the solid polytetrafluoroethylene in the aqueous colloidal dispersion before coagulation. Thus, it has been found that the polymer concentration should not exceed 50% solids by weight, and preferably should not exceed 20% solids by weight, since above 50% solids the coagulating particles tend to form too large agglomerates and the agitation cannot be controlled to give coagulated particles of the proper size and physical characteristics. In general, the lower the solids content of the aqueous dispersion, the smaller the size of the coagulated particle. Use of an aqueous colloidal dispersion containing less than 10% solids appears to be uneconomical due to handling of large volumes of water; hence, the preferred solids content of the dispersion should be in the range of 10%–20% by weight of the total polytetrafluoroethylene plus water present before coagulation.

Evidently, the particle size of the coagulated polymer is important in obtaining both satisfactory feeding continuously between two rolls as well as in obtaining rolled tape having relatively few electrical breaks. At least it appears that one difference in the particles obtained by coagulation under different amounts of applied power (e. g. different agitator speeds) is the average size of the resulting coagulated particles. Further, it has been observed that particles obtained by employing relatively large amounts of power (i. e. more than 1.00 horsepower per gallon of aqueous dispersion) cannot be fed continuously through the nip of two rotating rolls without agglomerating and stopping the feed. Hence, it is believed this type of particle is too small in size for rolling into tape. On the other hand, it has been observed that when power less than 0.08 horsepower per gallon of aqueous dispersion is employed during the coagulation, the resulting polytetrafluoroethylene particles can be fed very readily between two rolls to form a film or tape at a satisfactory rate without encountering any unusual difficulties in feeding. However, the resulting tape, after sintering, possesses an unusually large number of electrical breaks as determined by the test described hereinafter. Hence, it is evident the latter particles are of too large a size to weld together and form a continuous and homogeneous film. Accordingly, to obtain particles entirely suitable for rolling into satisfactory tape by the herein described process, only a relatively narrow range of power may be employed during coagulation of the aqueous polymer dispersion, and this preferred range for making rolled tape is from 0.08 to 0.80 horsepower per gallon of aqueous dispersion.

Various modifiers have been used heretofore during the coagulation of an aqueous colloidal dispersion of polytetrafluoroethylene. For example, an aqueous colloidal dispersion may be coagulated by adding either electrolytes or organic precipitants such as acetone, methanol and the like. These methods of coagulating aqueous colloidal dispersions of polytetrafluoroethylene produce coagulated particles which are highly agglomerated and too large for rolling into tape of the quality obtained in the practice of this invention.

It is further evident that it is not merely a certain particle size of the polymer which is required to produce satisfactory rolled tape, but it is also the particular surface characteristics of the individual particle prepared in a specific manner which determines how readily it may be fed to the rolls and how readily it will cohere with its neighbor particles to form a continuous sheet which upon sintering is relatively free from electrical breaks. For example, when using acetone as a coagulant for an aqueous colloidal dispersion of polytetrafluoroethylene, the coagulated particles appear to be more gelatinous than those prepared in accordance with this invention in the absence of all modifiers; and upon drying these acetone-coagulated particles, the particles agglomerate further to form large masses, which, when rolled and sintered, produce a tape which possesses a relatively large number of electrical breaks compared with the sintered tape obtained from powdered polymer made according to this invention. Even mere agitation in the absence of coagulants and other modifiers produces particles which are not suitable for rolling if the agitation conditions are such as to be outside of the limits of power input designated for this invention. In preparing the free-flowing granules by the herein described process, it is desirable to eliminate or minimize as much as possible the presence of any of the ingredients employed in the preparation of the aqueous polymer dispersion, such as catalysts, initiators, dispersing agents and stabilizers, as otherwise these ingredients may remain as residues which affect the electrical quality and discolor the rolled tetrafluoroethylene polymer tape. These residues are sources of weakness which may produce holes when the tape is subjected to an electrical stress.

When an aqueous colloidal dispersion of polytetrafluoroethylene is coagulated employing power in the range of 0.02 to 0.08 horsepower per gallon of dispersion, the coagulated particles obtained, although slightly too large for producing the best quality tape, are more advantageously employed for extrusion after the particles are first lubricated with various organic lubricants such as hydrocarbon oils, by the process described by Llewellyn and Lontz in U. S. Serial Number 171,534, filed June 30, 1950. Said process comprises extruding lubricated colloidal particles of tetrafluoroethylene polymer at 15° C.–150° C. (59° F.–302° F.) under pressure through an extrusion die to form shaped objects such as sheets, rods and wire coatings, followed by sintering the extruded objects at a temperature above 327° C. (621° F.).

The aqueous colloidal dispersion of tetrafluoroethylene polymer may be prepared by any suitable means provided the dispersion contains the correct amount of polymer, i. e., between 10% and 50% solids by weight. One method involves concentrating a dilute aqueous dispersion of colloidal polytetrafluoroethylene by adding a surface-active agent thereto, flocculating the polymer, separating the flocculated polymer, and redispersing the polymer to form a concentrated dispersion, which method is described by Berry in U. S. Patent 2,478,229. A particularly suitable and preferred process for obtaining a homopolymer or copolymer dispersion is described by Berry in U. S. Serial Number 171,241, filed June 29, 1950 now abandoned, wherein tetrafluoroethylene is polymerized with or without other polymerizable monomers, in an aqueous medium in the presence of an alkali metal or ammonium salt of an acid of the formula

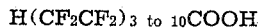

$$H(CF_2CF_2)_{3 \text{ to } 10}COOH$$

as dispersing agent, and a water soluble polymerization catalyst such as disuccinic acid peroxide, i. e. $(HOOCCH_2CH_2COO)_2$. Also, a concentrated dispersion may be diluted with water to form the desired solids content. Still another method of preparing the dispersion involves electrodecantation of a dilute dispersion of polytetrafluoroethylene as described in British Patent 642,025. If it is desired to start with a dilute aqueous dispersion of polytetrafluoroethylene and then concentrate this to the desired solids content, a particularly suitable method for obtaining the dilute dispersion is described by Renfrew in U. S. Patent 2,534,058. Aqueous dispersion of tetrafluoroethylene polymers in which the end groups of the polymer chain are supplied by non-polymerizable compounds may be employed in practising this invention.

*Example 1.*—The equipment used in this experiment comprised a 1-gallon stainless steel beaker 6.5 inches in diameter and 7.5 inches deep with four rectangular baffles approximately ⅜ inch by 1 inch attached to the cover and which extended to within 3 inches of the bottom of the beaker when the cover was placed in position covering the beaker. The baffles were equidistantly spaced around the inside circumference of the vessel. An agitator inserted through the center of the cover extended to within 1 inch of the bottom of the beaker when in operating position. The stainless steel agitator was of the open turbine type having 4 blades, each 1½ inch in height, the overall effective diameter of the agitator being 5 inches.

One half gallon of an aqueous dispersion of polytetrafluoroethylene containing 17% solid polymer by weight was added to the beaker. This dispersion had been obtained by polymerizing tetrafluoroethylene in an aqueous medium containing disuccinic acid peroxide and a dispersing agent of the formula

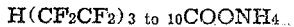

$$H(CF_2CF_2)_{3 \text{ to } 10}COONH_4$$

in accordance with the process described by Berry in U. S. Serial Number 171,241. The agitator was operated at 1000 R. P. M. for 50 seconds while the dispersion was at 176° F. The coagulated polymer floated on top of the aqueous phase and appeared to be not wetted by the water. The water was decanted from the beaker and the polymer was given a hot water (176° F.) and then a cold water (60° F.) wash. The water was drained off and the wet polymer was placed on a 100 mesh screen, and the screen placed in an oven at 230° F. for 16 hours. The power supplied to the dispersion was 0.72 horsepower per gallon. The resulting free-flowing granular polytetrafluoroethylene, which passed through 6–8 mesh Tyler standard screen sieves, was continuously hand fed without any agglomeration into the nip of two rotating rolls set apart by an air gap of 4 mils at the nip, at 170° F. to form a 6-mil tape, which was then fed through a sintering oven at 842° F. The resulting tape was translucent and bluish-white in color. A dielectric breakdown test using 500 volts per mil applied voltage on a sample of this tape showed 11 breaks in 40 feet, which is equivalent to 27 breaks per 100 feet.

*Example 2.*—A conical bottom stainless steel kettle of the following dimensions was used to coagulate an aqueous colloidal dispersion of polytetrafluoroethylene.

| | Inches |
|---|---|
| Diameter | 16 |
| Depth | 22 |
| Depth of cone | 6 |

Four baffles 1½ inches wide, extending from the top of the kettle to the top of the cone, were spaced 90 degrees apart around the periphery of the kettle. The top of the kettle was fitted with a removable cover with openings for a stirrer shaft and a sight port. An open turbine type agitator of the following dimensions was used:

| | |
|---|---|
| Pitch | 45°, up |
| Blades | 6, stainless |
| Length | 8 inches |
| Height | 1 inch |

Three gallons of the polytetrafluoroethylene dispersion (35% polymer by weight), obtained by the same process as that described in Example 1, was charged to the coagulation kettle and diluted with 4 gallons of water to give a 15% solids dispersion. The agitator was started and operated at 700 R. P. M., with the dispersion at 60° F. One and one-half to two minutes of agitation was required to coagulate the dispersion. At this point, the coagulum was a jelly-like mass and further agitation (2 to 3 minutes) was required to produce a non-water-wet granular powder. The "dry" polymer floated on the surface of the water and it was necessary to drain off the mother liquor and then use flushing water to remove the granules from the kettle onto a tilted dewatering screen which removed the largest globules of water. The wet polymer was dried for 48 hours in an oven at 248° F. The power supplied to the dispersion in this example amounted to 0.09 horsepower per gallon of aqueous dispersion in the vessel. The dried granules were free-flowing and appeared to resemble the product formed in Example 1. The granules were mechanically metered without agglomeration into the nip of two rolls, set by an air gap of 3.5 mils at the nip, at 293° F. as in Example 1 to form a 5-mil tape, which was led through a molten salt bath at 855° F. to sinter the tape. The resulting sintered tape was white with a bluish tinge. Six samples of this tape were subjected to the dielectric breakdown test using 500 volts per mil applied voltage. The average number of breaks for the six samples was only 17 per 100 feet.

A sample of 5-mil sintered polytetrafluoroethylene tape shaved from a molded cylinder of the polymer by the process described in U. S. Patent 2,406,127, when subjected to the same dielectric test conditions as described above, showed 64 breaks per 100 feet.

The rolling conditions necessary for producing satisfactory tape from the free-flowing polytetrafluoroethylene obtained in accordance with the coagulation limitations of this invention comprise continuously feeding the granulated polymer into the nip of two calendering rolls maintained at a temperature of 32° F.–392° F., removing the unsintered film, tape or sheet from the exit end of the nip and heating the unsintered tape to a temperature of 621° F.–932° F. for a time sufficient to completely sinter the polymeric tape. Tapes with a thickness between 0.001 and 0.020 inch are most advantageously produced in accordance with the conditions outlined herein, the particular thickness desired being obtained by suitable adjustment of the air-gap between the two rolls at the nip. In the sintering step, it is preferred to use a liquid heat transfer medium such as a molten sodium nitrate-sodium nitrite bath, although other heating means may be used, such as an air oven. The sintering time should be at least 5 seconds when employing the highest sintering temperatures (i. e., around 932° F.). As the sintering temperature is decreased, the allowable time for producing satisfactory tape progressively increases. At the lowest sintering temperatures (i. e., around 621° F.) times in excess of 30 minutes are permissible, but in general short times are preferred for economical reasons.

The dielectric breakdown test referred to in the examples and elsewhere in the specification is carried out by passing the sample of polytetrafluoroethylene tape between a pair of one-half inch spring loaded electrodes at a constant speed of 50 feet per minute, and an average voltage gradient of 500 volts per mil of tape thickness is applied across the electrodes. The number of flaws or electrical breaks is recorded for the length of the tape samples, and the result given as the number of breaks per 100 feet. An electrical break occurs at points in the polytetrafluoroethylene tape which fail to withstand the applied voltage, these failure points being due to weak spots in the tape which may be caused by one or more reasons, such as contamination, insufficient welding of the polymer particles, insufficient sintering, and the like.

While the invention has been described chiefly with respect to polytetrafluoroethylene (i. e., tetrafluoroethylene homopolymer) it is to be understood that the invention also applies to other tetrafluoroethylene polymers. Thus, tetrafluoroethylene copolymers comprising the polymerization product of a mixture of tetrafluoroethylene and another unsaturated organic compound (e. g., ethylene and chlorotrifluoroethylene) containing a terminal ethylenic double bond, said organic compound being copolymerizable with tetrafluoroethylene and being present in said mixture in an amount of up to 15% of the combined weight of tetrafluoroethylene and said organic compound, may be employed in place of polytetrafluoroethylene, provided the presence of the other compounds does not destroy the essential and characteristic qualities of the colloidal particles. Also there may be employed tetrafluoroethylene polymers in which the end groups of the polymer chain are supplied by non-polymerizable compounds (e. g., methanol and ethanol) which are present during the polymerization reaction. The term "tetrafluoroethylene polymer" as used herein covers the above three types of polymers, it being understood that all the tetrafluoroethylene polymers of this invention possess a high degree of polymerization and a sintering temperature of at least 572° F. Above the sintering temperature such polymers form a gel but they do not actually melt to a liquid. This is in contrast to the known relatively low molecular weight polymers derived from tetrafluoroethylene and certain tetrafluoroethylene polymer waxes, both of which have sharp melting points.

The chief advantage of the process of this invention is that it yields a granular polytetrafluoroethylene, the particles of which are peculiarly suited to feeding into the nip of two rolls for the continuous pressing of films, tapes and sheets of polytetrafluoroethylene having good electrical and mechanical properties, especially when the power supplied is in the range of 0.08 to 0.80 horsepower per gallon of dispersion. In fact, tape rolled from the granular polymer produced according to the process of this invention is superior in having fewer electrical breaks and in certain other properties to tape prepared by shaving a molded preform of polytetrafluoroethylene according to the process described in U. S. Patent 2,406,127. Also the powder of this invention is more readily fed continuously through the nip of the rolls than the powdered polymer employed in U. S. Patent 2,400,099, the latter powder being entirely different in surface characteristics and feel since it was not coagulated from an aqueous colloidal dispersion of the polymer.

The granular tetrafluoroethylene polymer of this invention is particularly useful for feeding between rolls to produce continuous homogeneous unsupported films, tapes and sheets in thicknesses which, for example, may vary from 0.001 to 0.020 inch. It may also be used for other applications, such as for "cold" lubricated extrusion of the polymer to produce variously shaped extruded articles, as well as molded articles.

I claim:

1. In a process for preparing tetrafluoroethylene polymer articles, the steps which comprise imparting energy to an aqueous colloidal dispersion consisting essentially of water and tetrafluoroethylene polymer, which dispersion is stable on storage and which has a tetrafluoroethylene polymer content of 10% to 50% by weight, by means of internal rotary stirring in opposition to baffles, said imparting of energy being effective throughout a major part of the said dispersion, the temperature of the dispersion being from 32° F. to 185° F., the amount of power thus supplied to the dispersion being in the range of 0.02 to 1.00 horsepower per gallon of the dispersion, whereby particles of tetrafluoroethylene polymer coagulate, and removing the said coagulated particles from the mixture, whereby there is formed a free-flowing granular product which can be consolidated under pressure and converted to a sintered article by heating at a temperature of 621° F. to 932° F.

2. In a process for preparing tetrafluoroethylene polymer articles, the steps which comprise importing energy to an aqueous colloidal dispersion consisting essentially of water and tetrafluoroethylene polymer, which dispersion is stable on storage and which has a tetrafluoroethylene polymer content of 10% to 20% by weight, by means of internal rotary stirring in opposition to baffles, said imparting of energy being effective throughout a major part of the said dispersion, the temperature of the dispersion being from 60° F. to 110° F., the amount of power thus supplied to the dispersion being in the range of 0.08 to 0.80 horsepower per gallon of the dispersion, whereby particles of tetrafluoroethylene polymer coagulate, removing the said coagulated particles from the mixture, and drying the said coagulated particles, whereby there is formed a free-flowing granular product which can be consolidated under pressure and completely sintered by heating at a temperature of 621° F. to 932° F.

3. In a process for preparing polytetrafluoroethylene articles, the steps which comprise imparting energy to an aqueous colloidal dispersion consisting essentially of water and polytetrafluoroethylene which dispersion is stable on storage, and which has a polytetrafluoroethylene content of 10% to 20% by weight, by means of internal rotary stirring in opposition to baffles, said imparting of energy being effective throughout a major part of the said dispersion, the temperature of the dispersion being from 60° F. to 110° F., the amount of power thus supplied to the dispersion being in the range of 0.08 to 0.80 horsepower per gallon of the dispersion, whereby particles of polytetrafluoroethylene coagulate, removing the said coagulated particles from the mixture, and drying the said coagulated particles, whereby there is obtained a free-flowing granular powder which can be consolidated under pressure and completely sintered by heating at a temperature of 621° F. to 932° F.

JOHN F. LONTZ.

REFERENCES CITED

The following references are of record in the file of this patent:

Borders: Ind. Eng. Chem., 40, pages 1473–1477 (1948).